United States Patent
Takada et al.

(10) Patent No.: US 10,102,869 B1
(45) Date of Patent: Oct. 16, 2018

(54) MAGNETIC DISK DEVICE AND READ METHOD

(71) Applicants: Kabushiki Kaisha Toshiba, Minato-ku, Tokyo (JP); Toshiba Electronic Devices & Storage Corporation, Minato-ku, Tokyo (JP)

(72) Inventors: Kazuya Takada, Kamakura Kanagawa (JP); Kenji Yoshida, Kamakura Kanagawa (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 15/916,541

(22) Filed: Mar. 9, 2018

(30) Foreign Application Priority Data

Aug. 28, 2017 (JP) .................................. 2017-163452

(51) Int. Cl.
| | |
|---|---|
| G11B 5/09 | (2006.01) |
| G11B 5/012 | (2006.01) |
| G11B 5/54 | (2006.01) |
| G11B 25/04 | (2006.01) |
| G11B 5/00 | (2006.01) |

(52) U.S. Cl.
CPC ............... *G11B 5/012* (2013.01); *G11B 5/54* (2013.01); *G11B 25/043* (2013.01); *G11B 2005/0005* (2013.01)

(58) Field of Classification Search
CPC ........... G11B 5/012; G11B 27/36; G11B 5/02; G11B 2220/20; G11B 20/1426; G11B 5/09; G11B 20/10009; G11B 27/3029; G11B 2220/90; G11B 20/18
USPC .................................... 360/25, 31, 40, 48, 53
See application file for complete search history.

(56) References Cited

U.S. PATENT DOCUMENTS

| | | | |
|---|---|---|---|
| 7,139,873 B1 | 11/2006 | Ruster et al. | |
| 7,730,238 B1 | 6/2010 | Arulambalam et al. | |
| 8,638,520 B2 | 1/2014 | Takada et al. | |
| 2007/0273995 A1* | 11/2007 | Unoki | G11B 20/1217 360/39 |
| 2015/0049771 A1 | 2/2015 | Konriki et al. | |

* cited by examiner

*Primary Examiner* — Nabil Hindi
(74) *Attorney, Agent, or Firm* — White & Case LLP

(57) ABSTRACT

According to one embodiment, a magnetic disk device including a disk, a head which reads data from the disk, a memory which records data, and a controller which includes a table, and records, at a first time point at which a read gate is open, a first area number of a first area of the table in which first information related to first data is recorded, a first serial number of the first data added when the read gate is open, and a first count value of the first data, in the first area.

20 Claims, 6 Drawing Sheets

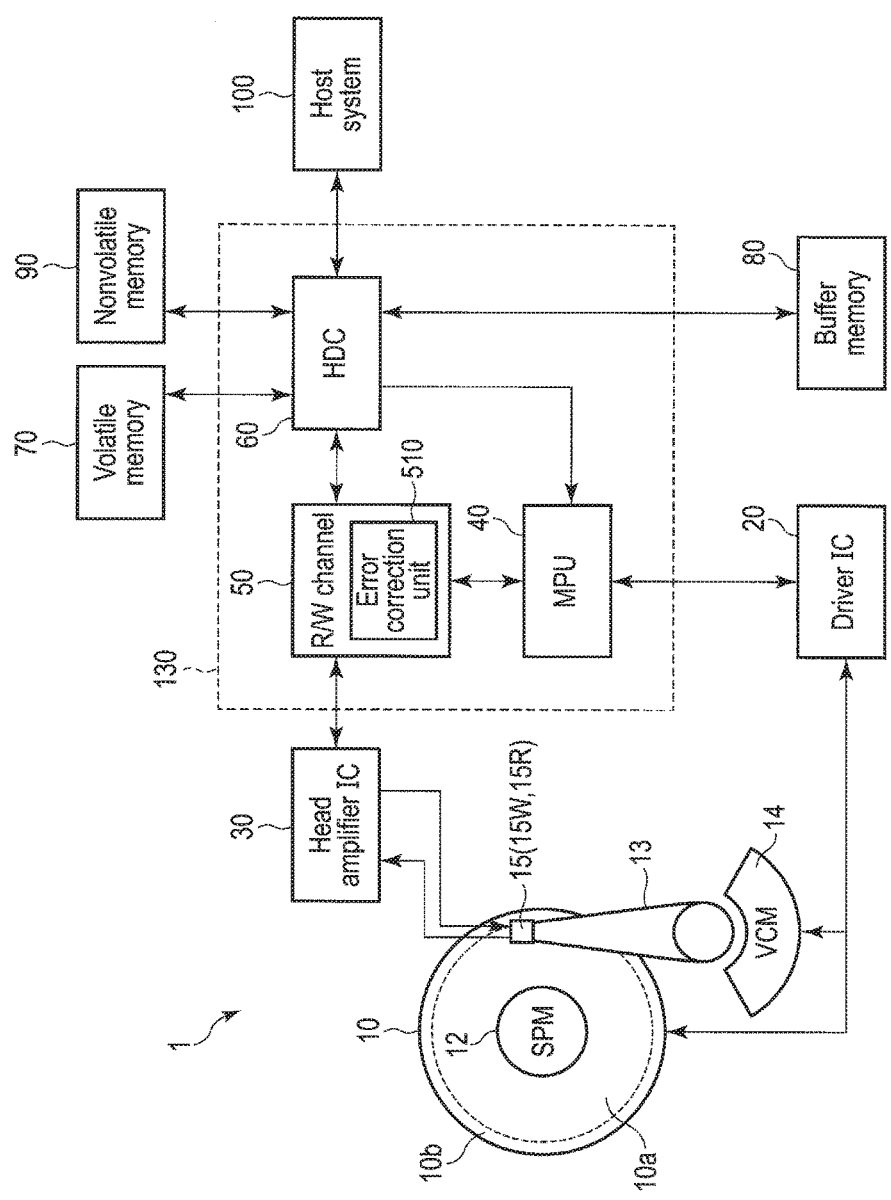
F I G. 1

| ENTRY | VLD | TAG | F_ENT | L_ENT | BADR | C_SIZE |
|---|---|---|---|---|---|---|
| 23 | 1 | 50 | NULL | NULL | ADR3 | 1 |
| 29 | 0 | — | — | — | — | — |
| 31 | 0 | — | — | — | — | — |

| ENTRY | VLD | TAG | F_ENT | L_ENT | BADR | C_SIZE |
|---|---|---|---|---|---|---|
| 23 | 1 | 50 | NULL | 29 | ADR3 | 1 |
| 29 | 1 | 51 | 23 | NULL | ADR5 | 1 |
| 31 | 0 | — | — | — | — | — |

| ENTRY | VLD | TAG | F_ENT | L_ENT | BADR | C_SIZE |
|---|---|---|---|---|---|---|
| 23 | 1 | 50 | NULL | 29 | ADR3 | 1 |
| 29 | 1 | 51 | 23 | 31 | ADR5 | 1 |
| 31 | 1 | 52 | 29 | NULL | ADR18 | 1 |

| ENTRY | VLD | TAG | F_ENT | L_ENT | BADR | C_SIZE |
|---|---|---|---|---|---|---|
| 23 | 1 | 50 | NULL | 31 | ADR3 | 2 |
| 29 | 0 | — | — | — | — | — |
| 31 | 1 | 52 | 23 | NULL | ADR18 | 1 |

F I G. 4A

| ENTRY | VLD | TAG | F_ENT | L_ENT | BADR | C_SIZE |
|---|---|---|---|---|---|---|
| 23 | 1 | 50 | NULL | NULL | ADR3 | 3 |
| 29 | 0 | — | — | — | — | — |
| 31 | 0 | — | — | — | — | — |

F I G. 4B

MAGNETIC DISK DEVICE AND READ METHOD

CROSS-REFERENCE TO RELATED APPLICATIONS

This application is based upon and claims the benefit of priority from Japanese Patent Application No. 2017-163452, filed Aug. 28, 2017, the entire contents of which are incorporated herein by reference.

FIELD

Embodiments described herein relate generally to a magnetic disk device and a read method.

BACKGROUND

Magnetic disk devices apply error checking and correcting (ECC) to the read data read from disks. For example, magnetic disk devices perform a decoding process for the read data, using a low density parity check (LDPC). Magnetic disk devices may repeatedly perform a decoding process over and over again for data (error data) which failed in a decoding process. In this case, the magnetic disk devices perform a process (out-of-order execution) for transmitting data having no error to a buffer memory before the error data. Recently, in the out-of-order execution of magnetic disk devices, the time (latency) until error data is transmitted to a buffer memory has been increased.

BRIEF DESCRIPTION OF THE DRAWINGS

FIG. 1 is a block diagram showing the configuration of a magnetic disk device according to an embodiment.

FIG. 3A is a schematic diagram showing an example of a management table according to the embodiment.

FIG. 3B is a schematic diagram showing the example of the management table according to the embodiment.

FIG. 3C is a schematic diagram showing the example of the management table according to the embodiment.

FIG. 4A is a schematic diagram showing an example of the management table according to the embodiment.

FIG. 4B is a schematic diagram showing the example of the management table according to the embodiment.

DETAILED DESCRIPTION

Figure 2:
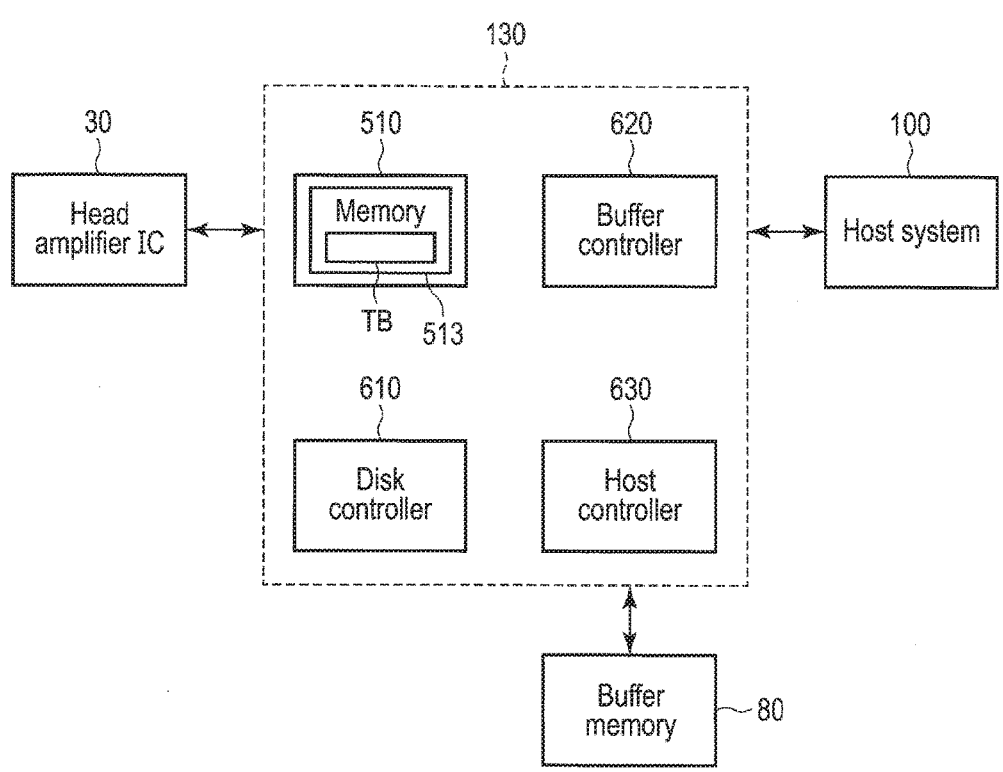
FIG. 2 is a block diagram showing a configuration example of the read system of the magnetic disk device according to the embodiment.

In general, according to one embodiment, a magnetic disk device comprises: a disk; a head which reads data from the disk; a memory which records data; and a controller which comprises a table, and records, at a first time point at which a read gate is open, a first area number of a first area of the table in which first information related to first data is recorded, a first serial number of the first data added when the read gate is open, and a first count value of the first data, in the first area.

According to another embodiment, a magnetic disk device comprises: a disk; a head which reads data from the disk; a memory which records data; and a controller which comprises a table, the table comprising: a first area which records a first serial number of first data added at a first time point at which a read gate is open, and a first count value of the first data; and a second area which records a second serial number of second data added at a second time point at which the read gate is open immediately before the first data, and a second count value of the second data, the controller combining the first count value with the second count value in the table at a third time point for transmitting the first data to the memory According to another embodiment, a read method applied to a magnetic disk device comprising a disk, a head which reads data from the disk, a memory which records data, and a controller which comprises a table, the method comprises at a first time point at which a read gate is open, recording a first area number of a first area of the table in which first information related to first data is recorded, a first serial number of the first data added when the read gate is open, and a first count value of the first data, in the first area.

An embodiment will be described hereinafter with reference to the accompanying drawings. The drawings are merely examples, and do not limit the scope of the invention.

Embodiment

FIG. 1 is a block diagram showing the configuration of a magnetic disk device 1 according to an embodiment.

The magnetic disk device 1 comprises a head disk assembly (HDA) as described later, a driver IC 20, a head amplifier integrated circuit (hereinafter, a head amplifier IC or a preamplifier) 30, a volatile memory 70, a buffer memory (buffer) 80, a nonvolatile memory 90, and a system controller 130 which is a single-chip integrated circuit. The magnetic disk device 1 is connected to a host system (host) 100.

The HDA comprises a magnetic disk (disk) 10, a spindle motor (SPM) 12, an arm 13 comprising a head 15, and a voice coil motor (VCM) 14. The disk 10 is rotated by the spindle motor 12. The arm 13 and the VCM 14 constitute an actuator. The actuator drives the VCM 14 such that the head 15 mounted on the arm 13 moves to the target position on the disk 10. Two or more disks 10 and heads 15 may be provided.

A recording area 10a available for the user and a system area 10b to which information necessary for system management is written are allocated to the recording area of the disk 10.

The head 15 comprises a write head 15W and a read head 15R mounted on a slider which is a main body. The write head 15W writes data onto the disk 10. The read head 15R reads the data recorded in the data tracks of the disk 10. The head 15 writes data onto the disk 10 in block units including at least one sector, and reads data in block units. Each sector is the data of the minimum unit of the data written to or read from the disk 10.

The driver IC 20 controls the driving of the SPM 12 and the VCM 14 in accordance with the control of the system controller 130 (specifically, an MPU 40 as described later).

The head amplifier IC 30 comprises a read amplifier and a write driver. The read amplifier amplifies a read signal read from the disk 10 and outputs the read signal to the system controller 130 (specifically, a read/write [R/W] channel 50 as described later). The write driver outputs write current to the head 15 in accordance with the write data output from the R/W channel 50.

The volatile memory 70 is a semiconductor memory in which the stored data is lost when power supply is stopped.

For example, data necessary for the process of each unit of the magnetic disk device 1 is stored in the volatile memory 70. The volatile memory 70 is, for example, a dynamic random access memory (DRAM) or a synchronous dynamic random access memory (SDRAM).

The buffer memory 80 is a semiconductor memory which temporarily records, for example, data transferred between the magnetic disk device 1 and the host 100. The buffer memory 80 may be integrally formed with the volatile memory 70. The buffer memory 80 is, for example, a DRAM, a static random access memory (SRAM), an SDRAM, a ferroelectric random access memory (FeRAM) or a magnetoresistive random access memory (MRAM).

The nonvolatile memory 90 is a semiconductor memory which retains the stored data even when power supply is stopped. The nonvolatile memory 90 is, for example, a NOR or NAND flash read only memory (FROM).

The system controller (controller) 130 is realized by, for example, using a large-scale integration (LSI) circuit called a System-on-a-Chip (SoC), in which a plurality of elements are integrated into a single chip. The system controller 130 includes the microprocessor (MPU) 40, the read/write (R/W) channel 50 and a hard disk controller (HDC) 60. The system controller 130 is connected to the driver IC 20, the head amplifier IC 30, the volatile memory 70, the buffer memory 80, the nonvolatile memory 90 and the host system 100.

The MPU 40 is a main controller which controls each unit of the magnetic disk device 1. The MPU 40 performs servo control for controlling the VCM 14 through the driver IC 20 and determining the position of the head 15. The MPU 40 controls the operation for wiring data to the disk 10, and selects the storage destination of write data transmitted from the host 100. The MPU 40 performs a process based on firmware. The MPU 40 is connected to each unit of the magnetic disk device 1. The MPU 40 is connected to the R/W channel 50 and the HDC 60.

The R/W channel 50 performs the signal process of read data and write data in accordance with an instruction from the MPU 40. Read data and write data may be simply referred to as data. The R/W channel 50 comprises a circuit or function for measuring the signal quality of read data. For example, the R/W channel 50 has a function for applying error checking and correcting (ECC) to the read data read from the disk 10. The R/W channel 50 also has a function for transmitting data having no error to the buffer memory before data (error data) which failed in a signal process, for example, a decoding process (out-of-order execution). The R/W channel 50 is connected to the head amplifier IC 30, the MPU 40 and the HDC 60.

The R/W channel 50 comprises an error correction unit 510. The error correction unit 510 applies error checking and correcting to data. For example, the error correction unit 510 performs a low density parity check (LDPC) decoding process. The error correction unit 510 applies an LDPC decoding process to the read data read from the disk 10. The error correction unit 510 may be provided in the HDC 60 described below.

The HDC 60 controls data transfer between the host 100 and the R/W channel 50 in accordance with an instruction from the MPU 40. For example, the HDC 60 stores user data transmitted from the host 100 in the buffer memory 80, and outputs the user data to the R/W channel 50. The HDC 60 stores the read data read from the disk 10 in the buffer memory 80, and outputs the read data to the host 100. The HDC 60 is connected to the MPU 40, the R/W channel 50, the volatile memory 70, the buffer memory 80, the nonvolatile memory 90 and the host 100.

In the head 15, the head amplifier IC 30 and the controller 130, the system for transmitting the read data read from the disk 10 to the host 100 is referred to as a read system.

FIG. 2 is a block diagram showing a configuration example of the read system of the magnetic disk device 1 according to the embodiment. FIG. 2 shows only the structures necessary for explanation.

The system controller 130 comprises, as the read system, the error correction unit 510, a disk controller 610, a buffer controller 620 and a host controller 630.

The error correction unit 510 comprises a memory 513. The error correction unit 510 comprises a management table TB in the memory 513. The management table TB includes the information of the read data to be subjected to a decoding process and be transmitted to the buffer memory 80 (read data information). The error correction unit 510 dynamically updates the management table TB when a read gate is asserted or when read data in which a decoding process is completed is transmitted to the buffer memory 80. To describe a case where a read gate is asserted, the expressions "a read gate is open" and "a read gate is issued" may be used.

The disk controller 610 is a cooperation unit between the R/W channel 50 and the HDC 60, and controls data transfer between the R/W channel 50 and the HDC 60. For example, the disk controller 610 outputs read data in which a decoding process is completed in the error correction unit 510 to the buffer controller 620 in block units or sector units. The buffer controller 620 controls data transfer between the HDC 60 and the buffer memory 80. For example, the buffer controller 620 stores the read data input from the disk controller 610 in the buffer memory 80, and outputs the data stored in the buffer memory 80 to the host controller 630. The buffer controller 620 manages the data recorded in the buffer memory 80. For example, the buffer controller 620 counts the data recorded in the buffer memory 80 in block units or sector units, and manages the consistency between the order of reading data from the disk 10 and the order of completing a decoding process from the information linked to the data. The host controller 630 controls data transfer between the HDC 60 and the host 100. For example, the host controller 630 outputs the read data input from the buffer controller 620 to the host 100 in block units or sector units.

FIG. 3A, FIG. 3B and FIG. 3C are schematic diagrams showing an example of the management table TB according to the embodiment. FIG. 3A to FIG. 3C show an example of the series of read steps of read data information when a read gate is asserted. In FIG. 3A to FIG. 3C, "ENTRY" indicates the area number (entry number) indicating the recording area (entry) of the management table TB in which read data information is recorded. "VLD" indicates whether the entry is occupied (valid) or empty (invalid). "TAG" indicates the order (serial number) of the read data to be added when a read gate is asserted. When the entry is valid, the VLD is a flag (first flag) indicating validity, for example, 1. When the entry is invalid, the VLD is a flag (second flag) indicating invalidity, for example, 0. Regarding the TAG, for example, 1 is added to data in which a read gate is asserted for the first time since the activation of the magnetic disk device 1. Subsequently, 1 is added every time a read gate is asserted. "F_ENT" indicates the entry number of the entry in which read data information corresponding to the TAG immediately before the TAG (target TAG) of the current target read data is recorded. "L_ENT" indicates the entry number of the entry in which read data information corresponding to the TAG immediately after the target TAG is recorded. "BADR"

indicates the address (in other words, the pointer) of the recording area of the buffer memory 80 in which read data is recorded. "C_SIZE" indicates the count value of the read data counted by the controller 130 when read data is recorded in the buffer memory 80. For example, the count value is the unit of data transmitted in the magnetic disk device 1, for example, the number of sectors (or the number of blocks). For example, the C_SIZE is the read data of each TAG, specifically, 1. The controller 130 may hold the total number of count values (in other words, the count number) in a memory, for example, in the nonvolatile memory 90.

The management table TB includes, as read data information, ENTRY, VLD, TAG, F_ENT, L_ENT, BADR and C_SIZE. In the example shown in the figures, in the management table TB, the entries of entry numbers 23, 29 and 31 are assumed to be invalid. In the management table TB, the read data information of read data for particular blocks (or sectors) is recorded in each entry. FIG. 3A to FIG. 3C show only the three entries of entry numbers 23, 29 and 31. However, the number of entries may be greater than three, or less than three. As read data information, the management table TB may not include all of the ENTRY, VLD, TAG, F_ENT, L_ENT, BADR and C-SIZE, or may include other information.

When a read gate is asserted, for example, the controller 130 records the read data information of the current target data (hereinafter, referred to as target read data), for example, the read data of TAG 50, in the entry of entry number 23. As shown in FIG. 3A, the controller 130 changes the VLD of the entry of entry number 23 from 0 to 1. The controller 130 records 50 in the TAG of the entry of entry number 23. When the read data information of the read data of the TAG immediately before TAG 50 is not present in the management table TB, the controller 130 records NULL in the F_ENT of the entry of entry number 23. When the read data information of the read data of the TAG immediately after TAG 50 is not present in the management table TB, the controller 130 records NULL in the L_ENT of the entry of entry number 23. For example, the controller 130 records ADR3 in the BADR of the entry of entry number 23, and records 1 in the C_SIZE of the entry of entry number 23. The controller 130 holds TAG 50 of the target read data as the latest TAG in the management table TB. When the read data information of other read data is not recorded in the management table, the controller 130 holds TAG 50 as the oldest TAG in the management table TB. The controller 130 may hold the information of the latest TAG and the oldest TAG in a memory, for example, in the volatile memory 70, the buffer memory 80 or the nonvolatile memory 90.

When a read gate is asserted, the controller 130 records the read data information of the target read data, for example, the read data of TAG 51, in, for example, the entry of entry number 29. As shown in FIG. 3B, the controller 130 changes the VLD of the entry of entry number 29 from 0 to 1. The controller 130 records 51 in the TAG of the entry of entry number 29. Since the read data information of the read data of TAG 50 immediately before TAG 51 is recorded in the entry of entry number 23, 23 is recorded in the F_ENT of the entry of entry number 29. Since the read data information of the read data of TAG 51 immediately after TAG 50 is recorded in the entry of entry number 29, the controller 130 changes the L_ENT of the entry of entry number 23 from NULL to 29. For example, the controller 130 records ADR5 in the BADR of the entry of entry number 29, and records 1 in the C_SIZE of the entry of entry number 29. The controller 130 changes the latest TAG in the management table TB from TAG 50 to TAG 51. The controller 130 holds TAG 50 as the oldest TAG in the management table TB.

When a read gate is further asserted, the controller 130 records the read data information of the target read data, for example, the read data of TAG 52, in, for example, the entry of entry number 31. As shown in FIG. 3C, the controller 130 changes the VLD of the entry of entry number 31 from 0 to 1. The controller 130 records 52 in the TAG of the entry of entry number 31. Since the read data information of the read data of TAG 51 immediately before TAG 52 is recorded in the entry of entry number 29, the controller 130 records 29 in the F_ENT of the entry of entry number 31. When the read data information of the read data of the TAG immediately after TAG 52 is not present in the management table TB, the controller 130 records NULL in the L_ENT of the entry of entry number 31. Since the read data information of the read data of the TAG immediately after TAG 51 is recorded in the entry of entry number 31, the controller 130 changes the L_ENT of the entry of entry number 29 from NULL to 31. For example, the controller 130 records ADR18 in the BADR of the entry of entry number 31, and records 1 in the C_SIZE of the entry of entry number 31. The controller 130 changes the latest TAG in the management table TB from TAG 51 to TAG 52. The controller 130 holds TAG 50 as the oldest TAG in the management table TB.

In the example shown in the figures, the entries of entry numbers 23, 29 and 31 are assumed to be invalid in the management table TB. However, when all the entries of the management table TB are valid, the controller 130 applies an error stop to the read process.

FIG. 4A and FIG. 4B are schematic diagrams showing an example of the management table TB. FIG. 4A and FIG. 4B show an example of the series of read steps of read data information when read data in which a decoding process is completed is transmitted to the buffer memory 80.

For example, as shown in FIG. 3C, when the entries of entry numbers 23, 29 and 31 of the management table TB are valid, the controller 130 terminates the decoding process of the read data of TAG 51 in which read data information is recorded in the entry of entry number 29, and transmits the read data of TAG 51 to the buffer memory 80. The controller 130 records the read data of TAG 51 in the recording area of address ADR5 of the buffer memory 80. As shown in FIG. 4A, the controller 130 changes the VLD of the entry of entry number 29 from 1 to 0. Since the TAG immediately after TAG 50 is TAG 52 in the management table TB, the controller 130 changes the L_ENT of the entry of entry number 23 in which the read data information of the read data of TAG 50 is recorded from 29 to entry number 31 in which the read data information of the read data of TAG 52 is recorded as shown in FIG. 4A. Since the TAG immediately before TAG 52 is TAG 50 in the management table TB, the controller 130 changes the F_ENT of the entry of entry number 31 in which the read data information of the read data of TAG 52 is recorded from 29 to entry number 23 in which the read data information of the read data of TAG 50 is recorded as shown in FIG. 4A. The controller 130 combines (merges) the C_SIZE of the entry of entry number 29 in which the read data information of the read data of TAG 51 transmitted to the buffer memory 80 is recorded with the C_SIZE of the entry of entry number 23 in which the read data information of the read data of TAG 50 is recorded. By merging the C_SIZE of the entry of entry number 29 with the C_SIZE of the entry of entry number 23, the controller 130 is capable of dealing with the read data of TAG 50 and the read data of TAG 51 such that they are continuously transmitted to the buffer memory 80 when the read data of TAG 50 is transmitted to the buffer memory 80. In other words, by merging the C_SIZE of the entry of entry number 29 with the C_SIZE of the entry of entry number 23, the controller 130 is capable of maintaining the consistency between the order of reading data from the disk 10 and the order of completing a decoding process. The controller 130 holds TAG 52 as the latest TAG in the management table TB. The controller 130 holds TAG 50 as the oldest TAG in the management table TB.

Subsequently, the controller 130 terminates the decoding process of the read data of TAG 52 in which read data information is recorded in the entry of entry number 31, and transmits the read data of TAG 52 to the buffer memory 80. The controller 130 records the read data of TAG 52 in the recording area of address ADR18 of the buffer memory 80. As shown in FIG. 4B, the controller 130 changes the VLD of the entry of entry number 31 from 1 to 0. Since the read data information of the read data of the TAG immediately after TAG 50 is not present in the management table TB, as shown in FIG. 4B, the controller 130 changes the L_ENT of the entry of entry number 23 in which the read data information of the read data of TAG 50 is recorded from 31 to NULL. The controller 130 merges the C_SIZE of the entry of entry number 31 in which the read data information of the read data of TAG 52 transmitted to the buffer memory 80 is recorded with the C_SIZE of the entry of entry number 23 in which the read data information of the read data of TAG 50 is recorded. By merging the C_SIZE of entry number 31 with the C_SIZE of the entry of entry number 23, the controller 130 is capable of dealing with the read data of TAG 50, the read data of TAG 51 and the read data of TAG 52 such that they are continuously transmitted to the buffer memory 80 when the read data of TAG 50 is transmitted to the buffer memory 80. The controller 130 changes the latest TAG in the management table TB from TAG 52 to TAG 50. The controller 130 holds TAG 50 as the oldest TAG in the management table TB.

Figure 5:
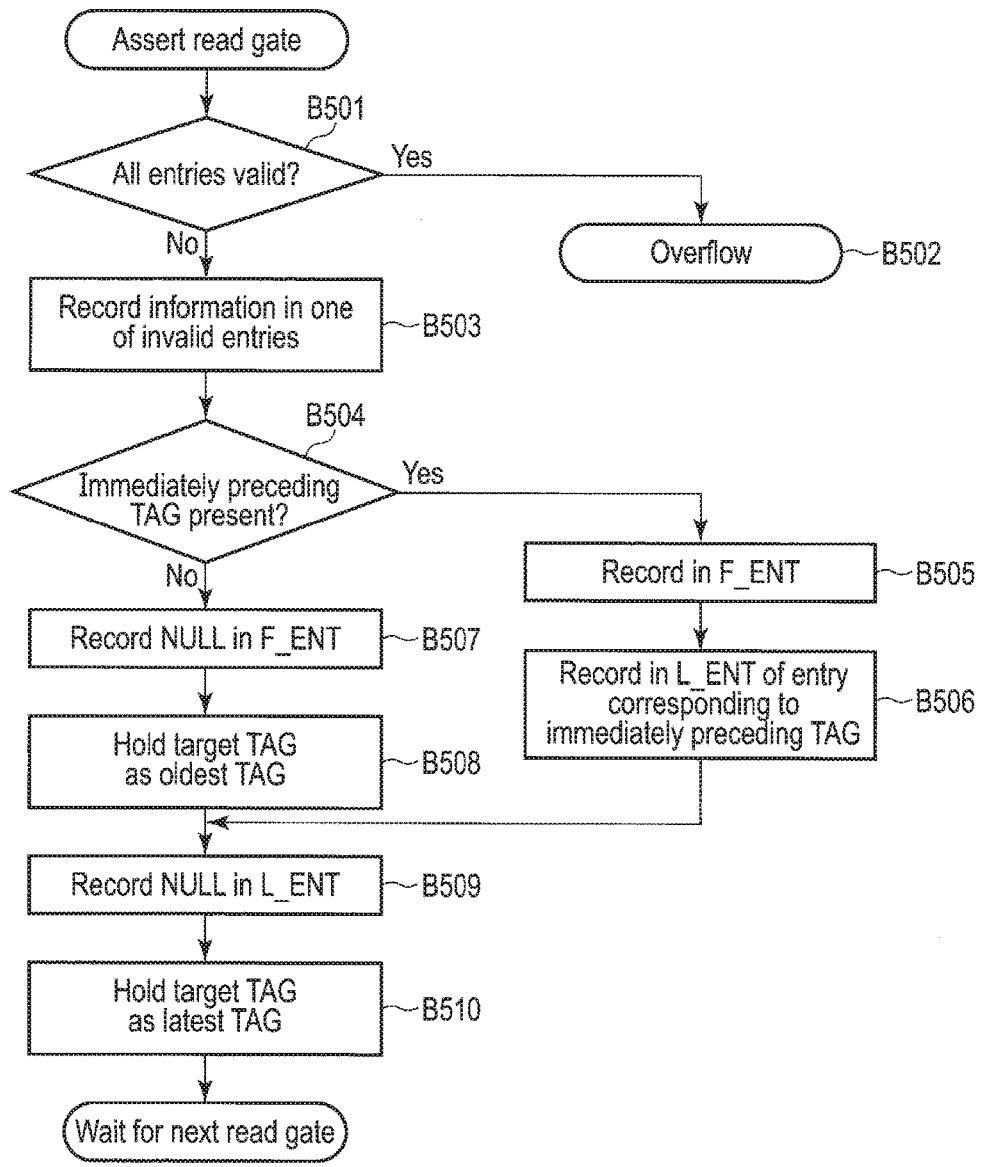
FIG. 5 is a flowchart of a read process when a read gate is asserted according to the embodiment.

FIG. 5 is a flowchart of a read process when a read gate is asserted according to the embodiment.

When a read gate is asserted, the controller 130 determines whether or not all the entries of the management table TB are valid (B501). When the controller 130 determines that all the entries of the management table TB are valid (YES in B501), the controller 130 determines that the current state is an overflow (B502). When the controller 130 determines that all the entries of the management table TB are valid, for example, the controller 130 determines that the current state is an overflow, and applies an error stop to the read process. When the controller 130 determines that at least one invalid entry is present in the management table TB (NO in B501), the controller 130 records the read data information of the target read data in one of the invalid entries of the entries of the management table TB (B503). The controller 130 determines whether or not the read data information of the read data of the TAG immediately before the target TAG (hereinafter, referred to as the immediately preceding read data) is present in the management table TB (B504). When the controller 130 determines that the read data information of the immediately preceding read data of the target TAG is present in the management table TB (YES in B504), the controller 130 records the entry number of the entry in which the read data information of the immediately preceding read data of the target TAG is recorded (hereinafter, referred to as the immediately preceding entry) in the F_ENT of the entry in which the read data information of the target read data is recorded (hereinafter, referred to as the target entry) (B505). The controller 130 records the entry number of the target entry in the L_ENT of the immediately preceding entry (B506), and proceeds to the process of B509. When the controller 130 determines that the read data information of the immediately preceding read data is not present in the management table TB (NO in B504), the controller 130 records NULL in the F_ENT of the target entry (B507). The controller 130 holds the target TAG as the oldest TAG in the management table TB (B508). The controller 130 records NULL in the L_ENT of the target entry (B509). The controller 130 holds the target TAG as the latest TAG in the management table TB (B510), and waits for the next read gate to be asserted.

Figure 6:
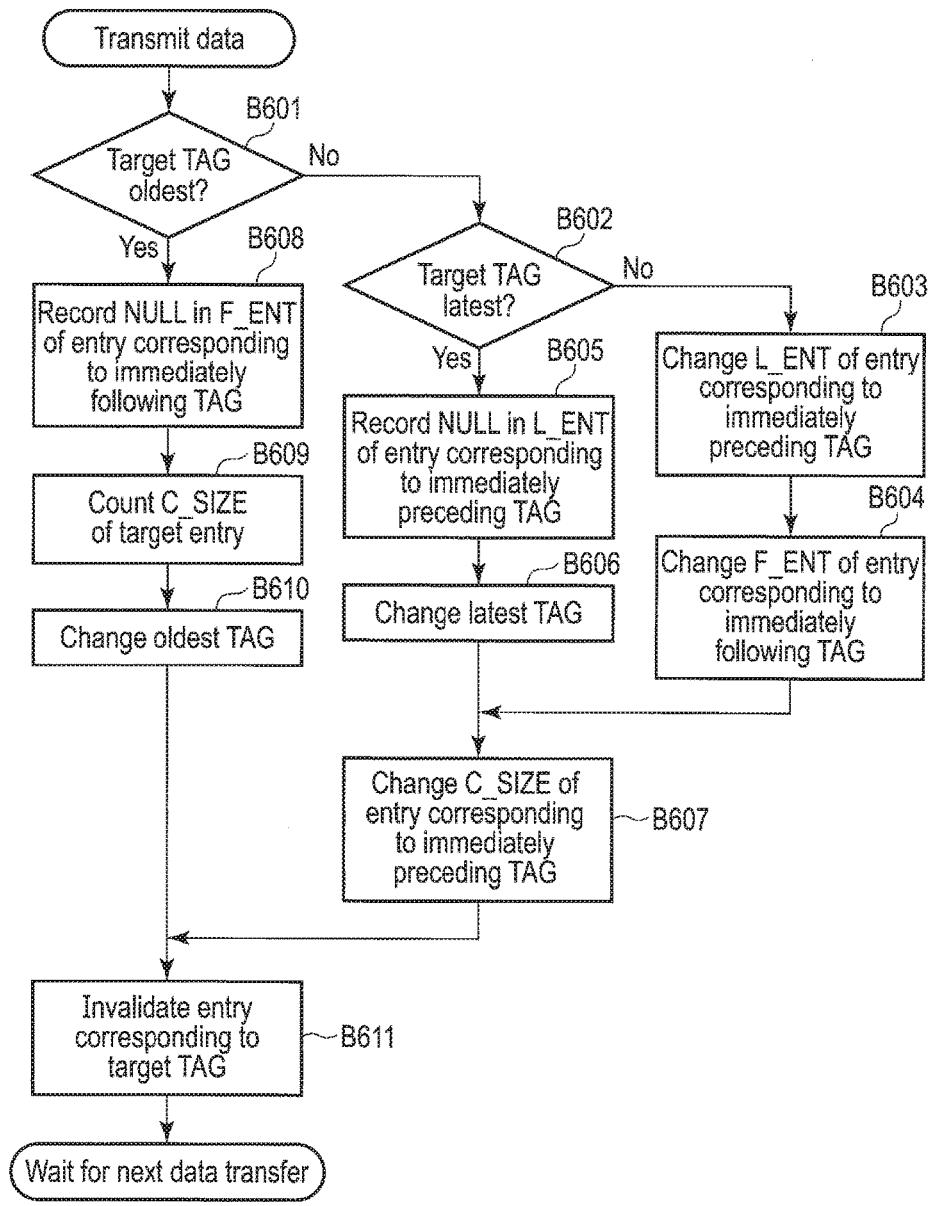
FIG. 6 is a flowchart of a read process when read data is transmitted to a buffer memory according to the embodiment.

FIG. 6 is a flowchart of a read process when read data is transmitted to the buffer memory 80 according to the embodiment.

When target read data is transmitted to the buffer memory 80, the controller 130 determines whether or not the target TAG is the oldest in the management table (B601). When the controller 130 determines that the target TAG is not the oldest (NO in B601), the controller 130 determines whether or not the target TAG is the latest in the management table TB (B602). When the controller 130 determines that the target TAG is not the latest in the management table TB (NO in B602), the controller 130 changes the L_ENT of the immediately preceding entry (B603). When the controller 130 determines that the TAG is not the latest, for example, the controller 130 changes the L_ENT of the immediately preceding entry to the entry number of the entry (hereinafter, referred to as the immediately following entry) in which the read data information of the read data (hereinafter, referred to as the immediately following read data) of the TAG immediately after the target TAG is recorded. The controller 130 changes the F_ENT of the immediately following entry (B604), and proceeds to the process of B607. For example, the controller 130 changes the F_ENT of the immediately following entry to the entry number of the immediately preceding entry, and proceeds to the process of B607.

When the controller 130 determines that the target TAG is the latest in the management table TB (YES in B602), the controller 130 records NULL in the L_ENT of the immediately preceding entry (B605). The controller 130 changes the latest TAG in the management table TB (B606). For example, the controller 130 changes the latest TAG in the management table TB from the target TAG to the TAG immediately before the target TAG. The controller 130 updates the C_SIZE of the immediately preceding entry (B607), and proceeds to the process of B610. For example, the controller 130 merges the C_SIZE of the target entry with the C_SIZE of the immediately preceding entry, and proceeds to the process of B610.

When the controller 130 determines that the target TAG is the oldest in the management table TB (YES in B601), the controller 130 records NULL in the F_ENT of the immediately following entry (B608). The controller 130 counts the C_SIZE of the target entry (B609). The controller 130 changes the oldest TAG in the management table TB (B610). For example, the controller 130 changes the oldest TAG in the management table TB from the target TAG to the TAG immediately after the target TAG. The controller 130 invalidates the target entry (B611), and waits for the time for transmitting the next read data to the buffer memory 80. For example, the controller 130 changes the VLD of the target entry from 1 to 0, and waits for the time for transmitting the next read data to the buffer memory 80.

In the present embodiment, the magnetic disk device 1 dynamically updates the management table TB when a read gate is asserted or when read data in which a decoding process is completed is transmitted to the buffer memory 80. When a read gate is asserted, for example, the magnetic disk device 1 records, in an empty recording area (invalid entry) of the management table TB, the serial number (TAG) of target read data, the entry number of the entry in which the information of the read data of the TAG immediately before the target TAG is recorded, the entry number of the entry in which the information of the read data of the TAG immediately after the target TAG is recorded, the address of the recording area of the buffer memory 80 in which the target read data is recorded, and the count value counted when the target read data is recorded in the buffer memory 80. The magnetic disk device 1 links read data information to each other in the management table TB by the entry number of the entry in which the information of the read data of the TAG immediately before the target TAG is recorded, and the entry number of the entry in which the information of the read data of the TAG immediately after the target TAG is recorded. Further, the magnetic disk device 1 merges the C_SIZE of the target entry with the C_SIZE of the immediately preceding entry in the management table TB when target read data is transmitted to the buffer memory 80. In this way, the C_SIZE of the target entry is merged with the C_SIZE of the immediately preceding entry in the management table TB. Thus, even when the decoding process of the read data of an old TAG is not completed, the magnetic disk device 1 is capable of transmitting the read data of a new TAG in which the decoding process is completed relative to the old TAG to the buffer memory 80. By merging the C_SIZE of the target entry with the C_SIZE of the immediately preceding entry in the management table TB, the magnetic disk device 1 is capable of decreasing the number of entries in the management table TB. Thus, even when the time (latency) required to transmit read data which failed in a decoding process to the buffer memory 80 is increased, the magnetic disk device 1 is capable of controlling the capacity of the management table TB. The magnetic disk device 1 is capable of effectively performing a read process.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a disk;
   a head which reads data from the disk;
   a memory which records data; and
   a controller which comprises a table, and records, at a first time point at which a read gate is open, a first area number of a first area of the table in which first information related to first data is recorded, a first serial number of the first data added when the read gate is open, and a first count value of the first data, in the first area.

2. The magnetic disk device of claim 1, wherein
   at the first time point, the controller records, in the first area, a second area number of a second area of the table in which second information related to second data of a second serial number immediately before the first serial number is recorded.

3. The magnetic disk device of claim 2, wherein
   at the first time point, the controller records, in the first area, a third area number of a third area of the table in which third information related to third data of a third serial number immediately after the first serial number is recorded.

4. The magnetic disk device of claim 3, wherein
   at the first time point, the controller records the first area number in the second area and the third area.

5. The magnetic disk device of claim 2, wherein
   at a second time point for transmitting the first data to the memory, the controller combines the first count value with a second count value of the second data recorded in the second area in the table.

6. The magnetic disk device of claim 4, wherein
   at a second time point for transmitting the first data to the memory, the controller determines whether the first serial number is the latest in the table, and
   when the controller determines that the first serial number is the latest, the controller updates the first serial number recorded in the second area.

7. The magnetic disk device of claim 4, wherein
   at a second time point for transmitting the first data to the memory, when the controller determines that the first serial number is neither the oldest nor the latest in the table, the controller changes the first serial number recorded in the second area to the third serial number, and changes the first serial number recorded in the third area to the second serial number.

8. The magnetic disk device of claim 1, wherein
   at the first time point, the controller records, in the first area in which the first data is recorded, a first flag indicating that the area is not empty.

9. The magnetic disk device of claim 5, wherein
   at the second time point for transmitting the first data to the memory, the controller records, in the first area, a second flag indicating that the area is empty.

10. A magnetic disk device comprising:
    a disk;
    a head which reads data from the disk;
    a memory which records data; and
    a controller which comprises a table, the table comprising:
        a first area which records a first serial number of first data added at a first time point at which a read gate is open, and a first count value of the first data; and
        a second area which records a second serial number of second data added at a second time point at which the read gate is open immediately before the first data, and a second count value of the second data,
    the controller combining the first count value with the second count value in the table at a third time point for transmitting the first data to the memory.

11. The magnetic disk device of claim 10, wherein
    the controller determines whether the first serial number is the latest in the table at the third time point, and
    when the controller determines that the first serial number is the latest, the controller updates the first serial number recorded in the second area.

12. A read method applied to a magnetic disk device comprising a disk, a head which reads data from the disk, a memory which records data, and a controller which comprises a table, the method comprising at a first time point at which a read gate is open, recording a first area number of a first area of the table in which first information related to first data is recorded, a first serial number of the first data added when the read gate is open, and a first count value of the first data, in the first area.

13. The read method of claim 12, wherein
at the first time point, a second area number of a second area of the table in which second information related to second data of a second serial number immediately before the first serial number is recorded is recorded in the first area.

14. The read method of claim 13, wherein
at the first time point, a third area number of a third area of the table in which third information related to third data of a third serial number immediately after the first serial number is recorded is recorded in the first area.

15. The read method of claim 14, wherein
at the first time point, the first area number is recorded in the second area and the third area.

16. The read method of claim 13, wherein
at a second time point for transmitting the first data to the memory, the first count value is combined with a second count value of the second data recorded in the second area in the table.

17. The read method of claim 15, wherein
at a second time point for transmitting the first data to the memory, whether the first serial number is the latest in the table is determined, and
when it is determined that the first serial number is the latest, the first serial number recorded in the second area is updated.

18. The read method of claim 15, wherein
at a second time point for transmitting the first data to the memory, when it is determined that the first serial number is neither the oldest nor the latest in the table, the first serial number recorded in the second area is changed to the third serial number, and
the first serial number recorded in the third area is changed to the second serial number.

19. The read method of claim 12, wherein
at the first time point, in the first area in which the first data is recorded, a first flag indicating that the area is not empty is recorded.

20. The read method of claim 16, wherein
at the second time point for transmitting the first data to the memory, in the first area, a second flag indicating that the area is empty is recorded.

* * * * *